United States Patent [19]
Jesse

[11] 3,899,282
[45] Aug. 12, 1975

[54] EJECTOR APPARATUS FOR MOLDING MACHINE
[75] Inventor: Edwin L. Jesse, West Caldwell, N.J.
[73] Assignee: Evans Products Company, Portland, Oreg.
[22] Filed: Mar. 8, 1973
[21] Appl. No.: 339,316

[52] U.S. Cl. .............................. 425/444; 164/347
[51] Int. Cl. ............................................. B28b 7/10
[58] Field of Search ........... 425/436, 444, 242, 243, 425/246, 247, 248, 249; 164/344, 347; 249/66, 67, 68; 264/334, 336

[56] References Cited
UNITED STATES PATENTS

| | | | |
|---|---|---|---|
| 1,318,404 | 10/1919 | Penn | 249/68 X |
| 1,939,831 | 12/1933 | Scheible | 164/347 X |
| 2,304,899 | 12/1942 | Dupre | 249/67 X |
| 2,787,815 | 4/1957 | Granade | 164/347 X |
| 2,860,376 | 11/1958 | Graves | 249/67 X |
| 2,876,495 | 3/1959 | Spillman | 425/249 |
| 2,955,335 | 10/1960 | Morgenstern | 164/347 X |
| 3,161,918 | 12/1964 | Zearbaugh | 425/242 X |
| 3,165,787 | 1/1965 | Carmack | 164/347 X |
| 3,726,625 | 4/1973 | Rees | 425/247 |

Primary Examiner—Francis S. Husar
Assistant Examiner—John S. Brown
Attorney, Agent, or Firm—Klarquist, Sparkman, Campbell, Leigh, Hall & Whinston

[57] ABSTRACT

An injection molding machine has fixed platen with numerous openings for receiving ejector rods in selected openings. An ejector plate is positioned behind platen to cause forward movement of rods. Mold mounted on platen has spring loaded ejection pins therein, pins being aligned with rods so that movement of rods causes ejection movement of pins. Multiple rod openings permits wide latitude of choice in location of rods and pins in mold and easy and quick change of molds for different parts.

7 Claims, 3 Drawing Figures

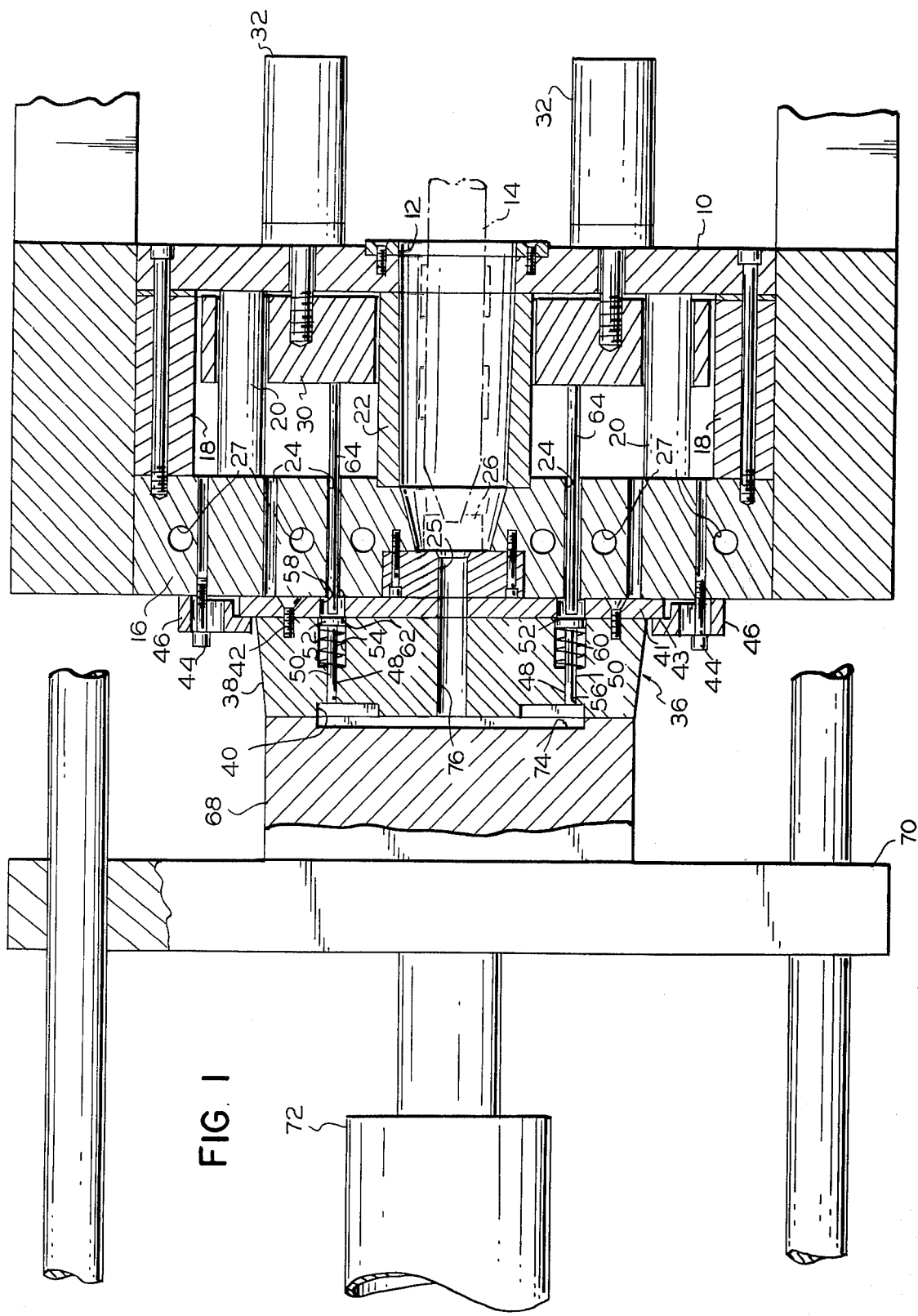
FIG. I

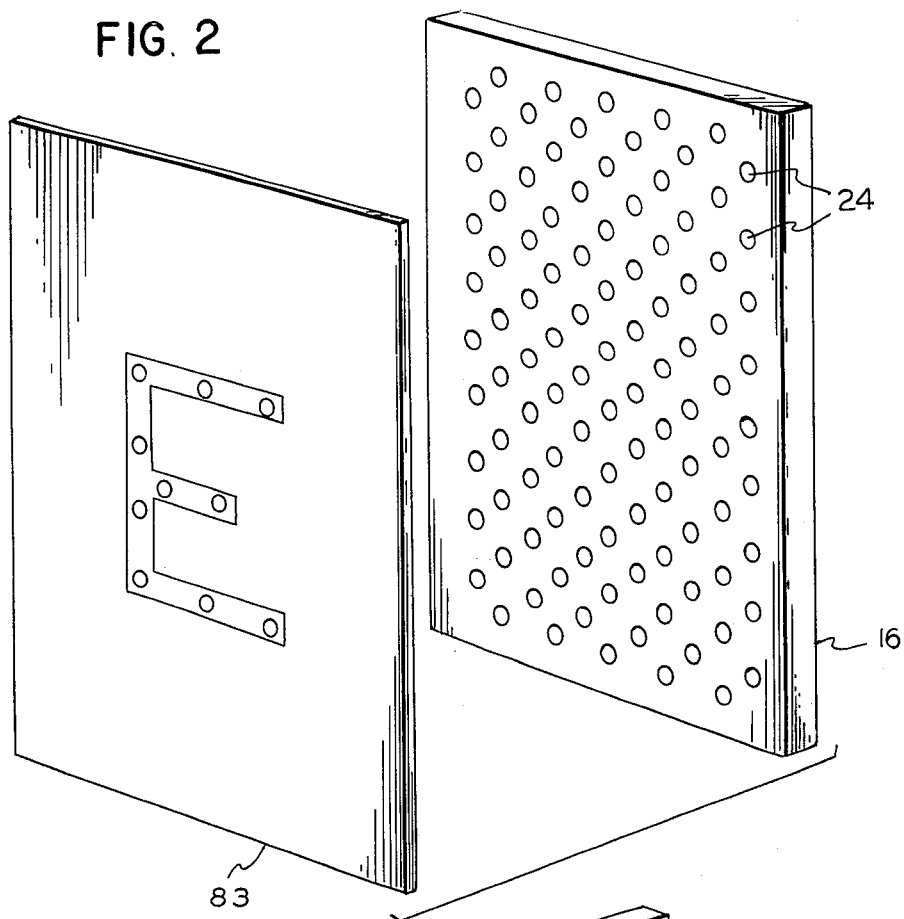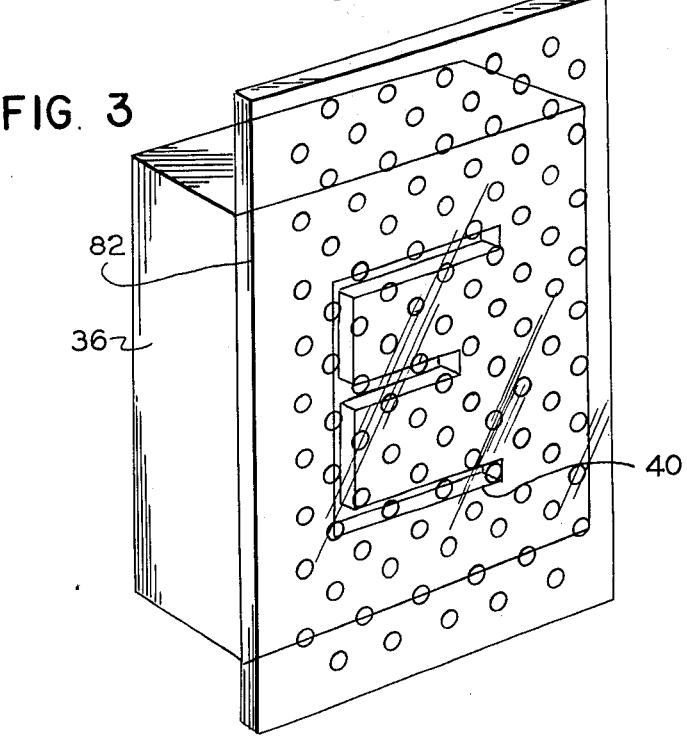

EJECTOR APPARATUS FOR MOLDING MACHINE

BACKGROUND OF THE INVENTION

In the injection molding of parts from plastic material, the heated plastic is injected into die cavities under extremely high pressure usually averaging 10,000 to 35,000 psi. After the plastic has hardened in the cooled mold, the mold is opened so that the molded part can be removed. Because of the extremely high pressure of the molding process, it is usually necessary forcefully to eject the molded part from one of the die cavities, the part in fact usually being formed so as to be retained within a particular cavity. Ejection is usually obtained by means of ejector pins arranged to be forced through openings in the die or mold so as to engage the part and push it from the mold cavity. The arrangement of the ejector pins in a molding machine has to be correlated of course with respect to the part being formed.

It is an object of the present invention to provide an ejector system for an ejection molding machine that facilitates the provisioning of ejector pins in a mold and further facilitates the adaptability of the injection molding machine to a variety of molds with a minimum of time and expense in changing molds.

Other objects and advantages of the invention will become more apparent hereinafter.

BRIEF DESCRIPTION OF THE INVENTION

In accordance with the invention an injection molding machine is provided with a fixed platen or top plate for mounting of the core side of a mold and which top plate is provided with a plurality of openings in a predetermined arrangement through which ejector rods may be moved longitudinally as desired. An hydraulically or otherwise suitably movable ejector plate is mounted behind the top plate for movement towards and away from the same. The core side of the mold is adapted to be mounted on the top plate in predetermined location with respect to a sprue hole in the top plate. The core side of the mold is provided with a plurality of ejector pins which are spring-biased to an inoperative position, but are movable longitudinally within the core side to effect ejection of a part molded therein. The core side is mounted upon the top plate with the ejector pins in substantial alignment with preselected openings in the top plate so as to be engaged by ejector rods which are forced against the ejector pin by suitable movement of the ejector plate after the part has been molded. A template of the openings in the top plate may be utilized to locate the position of ejector pins in the core side of a mold during formation of same, and a further template of the position of the openings in the core side of the mold may be utilized during the set up to locate the ejector rods in the openings in the top plate.

The system of the invention has numerous advantages including injection and ejection on the core side of the mold; an ejector system which is adaptable for use with a multitude of molds and enabling a single top plate to be used with a plurality of molds; and a system which facilitates rapid and inexpensive changeover of an injection molding machine from one mold to another.

DRAWINGS

FIG. 1 is a fragmentary sectional, somewhat schematic view of an injection molding apparatus embodying the invention;

FIG. 2 is an exploded perspective illustrating details of the invention; and

FIG. 3 is another exploded perspective view illustrating further details.

DETAILED DESCRIPTION OF THE INVENTION

Referring initially to FIG. 1, indicated at 10 is the bottom plate of a mold base and which plate is adapted to be suitably fixed in position on an injection molding machine by conventional mounting arrangements. The plate 10 is provided with a central opening 12 through which an injection nozzle indicated in dotted lines at 14 may be inserted or withdrawn from its plastic injecting position. Mounted forwardly of the bottom plate 10 is fixed platen or top plate 16 which is rigidly supported from the bottom plate by parallels 18 mounted along the edges thereof and suitably positioned pillars 20 sufficient in number and spacing to support the top plate against the pressure applied thereof during the injection of the mold. The path of the nozzle 14 is surrounded by a support ring 22. Referring more particularly to FIG. 2, the top plate 16 is provided with a plurality of injector rod openings 24 therethrough arranged in a predetermined pattern and through which ejector rods may slide and with a centrally positioned sprue hole 25 and a sprue bushing 26 for engaging the nozzle 14 during the injection step. Some of the openings may be tapped for a purpose to be explained. The top plate 16 is also provided with a plurality of cooling water passageways 27 therethrough.

An ejector plate 30 is mounted between the bottom plate 10 and top plate 16 for movement longitudinally of the injection machine, suitable means being provided to effect movement of the plate such as hydraulic cylinders indicated at 32. The plate 30 is provided with suitable openings to receive the pillars 20 and support ring 22.

The top plate 16 is adapted to have mounted thereon the stationary or core side 36 of a mold. The core side 36 includes a mold body 38 having formed therein a cavity 40 partially defining the part to be molded, in this case the part being shown as comprising the letter E. The core side body 38 is secured to an aluminum base plate 41 by suitable means such as screws 42. The periphery 43 of the plate 41 extends outwardly from the sides of the body 38. As was mentioned above, certain of the ejector rod openings 24 are tapped, this being for the purpose of receiving clamping screws 44 which extend through clamping members 46 which in turn engage the outwardly extending periphery 43 of the base plate 41.

The core side of the mold is provided with a plurality of ejector pins 48 which are positioned within the core side of the mold as is determined necessary to effect ejection of a part formed in the cavity 40. The ejector pins each comprises a shank 50 and a head 52 adapted to slide within a counterbore 54 while the shank 50 fits within a closely bored opening 56. The shank 50 may be of a diameter of about ¼ inch while the head 52 may have a diameter of about 1 inch. The base plate 40 is provided with an opening 58 of about ⅞ inch diameter and a compression spring 60 is provided in the counterbore 54 so as to bias the ejection pin head 52 against the stop or lip 62 defined by the plate 41. The ejector pins 48 are positioned within the mold core side 36 so that the pins will substantially align with ejector rod openings 24 in the top plate 16. Positioned within those openings 24 having an ejector pin aligned therewith are ejector rods 64 having a length such that they abut against the ejector plate 30 in its retracted position and terminate just short of the ejector pin head 52 as shown in FIG. 1. Because of the relatively large diameter of the head 52, there is obviously some latitude in the positioning of an ejector pin with respect to an ejector rod, that is the ejector pin and the ejector rod do not have to be coaxial and an ejector pin can be offset with respect to an ejector rod and located within the core so as to engage the molded part at a desired location. Other reasons may require non-alignment of an ejector pin with the ejector rod such as ribs, bosses, etc. within the core 36.

The core side of the mold 36 is matched of course with a movable or cavity side of the mold indicated at 68 and which is fixed to a movable platen 70 adapted to be moved forwardly and retracted as necessary by suitable means known to the art, such as an hydraulic cylinder indicated at 72. The mold 68 is provided with a part cavity 74 matching the cavity 40. The core side of the mold 38 is provided with a sprue opening 76 through which plastic may be injected into the part cavity 40, 74, the sprue opening 76 being in turn aligned with sprue opening 25 in the top plate 16.

Referring now to FIG. 3, in accordance with the invention a transparent template 82 is provided which has formed therein openings corresponding to the spacing of the ejector rod openings 24. Upon the construction of a mold the template 82 is utilized to locate where the ejector pins should be positioned in the mold core side 36. By positioning the template upon the core side of the mold it can be determined just where an ejector pin should be positioned within the core side of the mold so that it can be engaged by an ejector rod. The core is then bored and counterbored and the ejector pins mounted therein. When this has been completed, a second template 83 shown in FIG. 2 is prepared for the particular mold showing the position of the ejector pins therein or more particularly the location of the ejector rods which will engage the ejector pins in such mold. When a mold is to be mounted upon the top plate 16, the template 83 may be positioned upon the top plate and the ejector rods simply slipped through the openings in the template 83 and through the thus located openings in the top plate, all other ejector rods having previously been removed from the apparatus. Thereafter the mold is mounted upon the top plate by use of the clamps 46 and clamping screws 44 and the movable mold cavity 68 mounted upon the platen 70. The mold is then closed and an injection made. After the injected material has cooled and solidified, the platen 70 is withdrawn to retract the cavity side of the mold 68 which will expose the part formed within the mold cavity 40, 74. The ejector plate is then brought forward to cause the ejector rods to move forward and engage the ejector pins 48. Forward movement of the pins 48 will cause the molded part to be ejected from the core 36. When this has occurred, the ejector plate is withdrawn and the springs 60 will bias the ejector pins to their retracted position at the same time biasing the ejector rods back into their retracted position. The mold can then be closed and the cycle repeated.

As will be apparent the system of the invention has numerous advantages including the following. It allows injection of the plastic material from the core side of the mold and the ejection of the part from the same side. The injection molding apparatus need utilize only a single top plate for a variety of molds. Various molds can be mounted upon the top plate with a minimum of setup time by reason of the provision of the template 83 which rapidly locates the position of the ejector rods within the top plate. Obviously the ejector rods could be also located by a numbering system showing the openings into which ejector rods could be positioned for a particular mold. The use of the ejector pins with a large head allows for latitude in the positioning of the ejector pin within the core of the mold. Finally, the use of the return springs 60 within the molds also facilitates the return of the ejector rods to their inactive position.

Having illustrated and described a preferred embodiment of the invention, it will be apparent that the invention permits modification in arrangement and detail.

I claim:

1. A molding machine having relatively movable platens and mold portions removably mounted on said platens and which mold portions define a cavity in which a part is molded, a plurality of ejector pins in one of said mold portions, said pins being slidable within said one portion to cause projection of said pins into said cavity thereby to eject a part therefrom, an ejector plate mounted rearwardly of a first of said platens upon which said one mold portion is mounted, said ejector plate being mounted for movement toward and away from said first platen, said ejector plate being normally positioned in spaced relation to said first platen, said first platen having a plurality of openings therethrough in a regular array arranged generally over the entire area of said first platen for slidably receiving in selected ones thereof ejector rods, a plurality of ejector rods slidably mounted in selected ones of said first platen openings, said ejector rods being substantially aligned one with each of said ejector pins and adapted upon movement of said ejector plate from said normal position thereof to be moved forwardly to engage and move said ejector pins forwardly thereby ejecting a part from said cavity, said array of openings permitting utilization of said first platen with a plurality of molds having differing mold configurations and differing arrangements of ejector pins.

2. A molding machine as set forth in claim 1 wherein resilient means are operatively arranged with each of said ejector pins to bias the same out of said cavity.

3. A molding machine as set forth in claim 1 wherein each of said ejector pins comprises a small shank and an enlarged head portion for engagement by an ejector rod whereby to permit latitude of location of an ejector pin with respect to an ejector rod.

4. A molding machine as set forth in claim 1 wherein each of said ejector pins comprises a shank and an enlarged head portion sliding within a counterbore in said one mold portion, and compression spring means are operatively arranged in said counterbores to engage each said head portion and bias said pins to a withdrawn position with respect to said cavity, and stop means in said mold limiting the movement of said ejector pins under the bias of said springs.

5. A molding machine as set forth in claim 1 wherein said first platen is a fixed platen.

6. A molding machine as set forth in claim 1 comprising plastic injecting means operatively arranged with said first platen for injecting said cavity through said one mold portion.

7. In an injection molding machine having a fixed platen and a movable platen for mounting thereon of a core side and a cavity side, respectively, of a mold, said fixed platen having a plurality of openings therethrough for slidably receiving ejector rods in selected ones of said openings, an ejector plate mounted rearwardly of said fixed platen for movement toward and away from said fixed platen, means operatively connected to said ejector plate for moving said ejector plate toward said fixed platen to cause said ejector rods to be extended from the forward surface of said fixed platen, a core side of a mold mounted on said fixed platen and having in the front surface thereof opposite said fixed platen a cavity defining at least a portion of a part to be injection molded, said mold core side having a plurality of openings therethrough extending from said cavity to the rear surface abutting said fixed platen, said openings being counterbored from said rear surface, a plurality of ejector pins mounted one in each of said mold core side openings for sliding movement therein, said ejector pins each comprising an enlarged head slidably received with the counterbore of the corresponding opening, stop means operatively associated with each of said ejector pins to limit the rearward movement of said pins, spring means operatively arranged with each of said ejector pins for biasing the head thereof against said stop means, said ejector pins being so positioned that the head of each will be engaged by an ejector rod upon forward movement of the latter thereby to cause forward movement of said ejector pins to eject a part molded in said cavity, and a plurality of ejector rods arranged within said openings in said fixed platen, there being an ejector rod aligned one with each of said ejector pins.

* * * * *